UNITED STATES PATENT OFFICE.

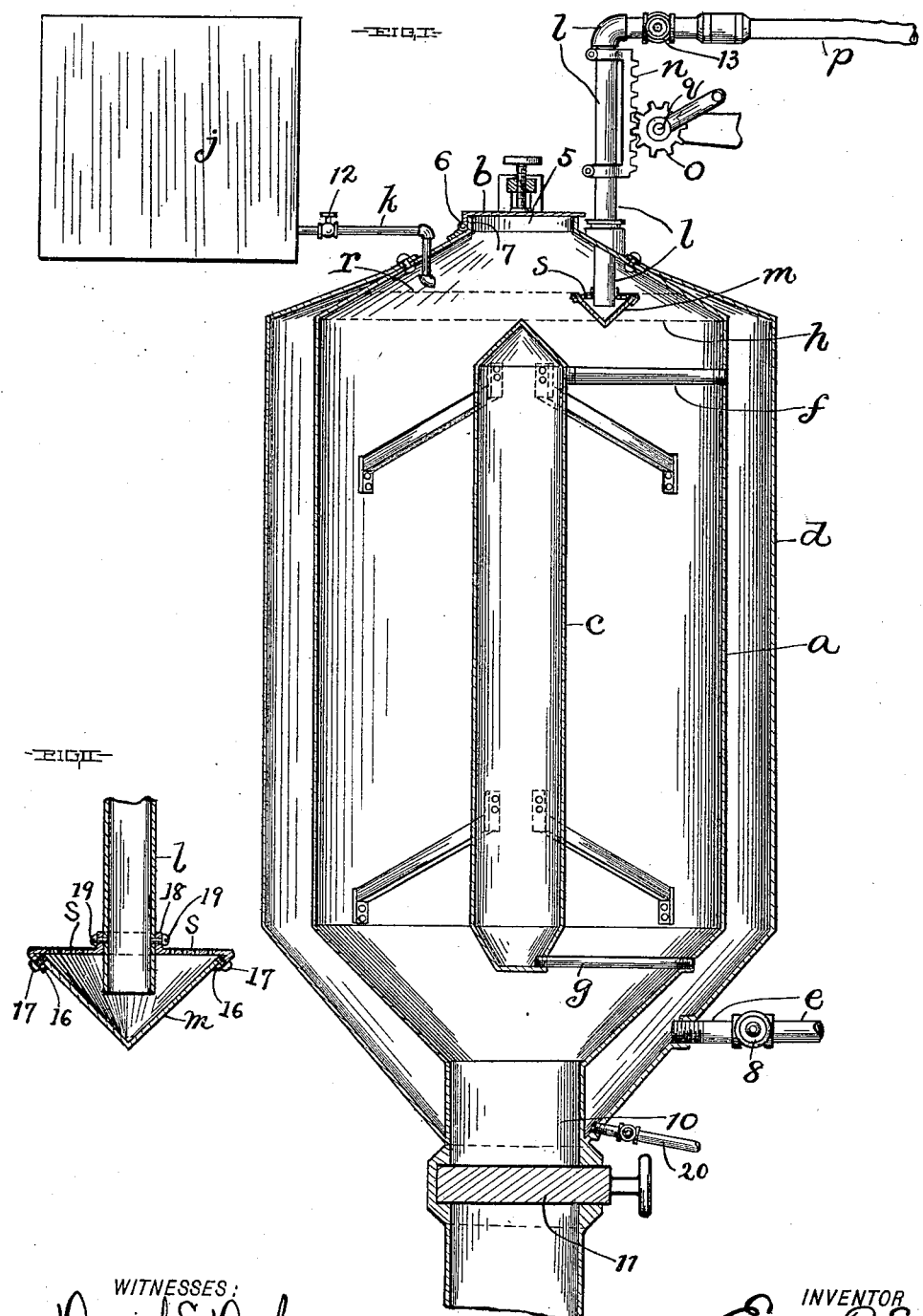

EUGENE R. EDSON, OF CLEVELAND, OHIO.

PROCESS OF EXTRACTING OIL FROM FISH OR OTHER MATERIAL.

SPECIFICATION forming part of Letters Patent No. 689,472, dated December 24, 1901.

Application filed May 10, 1901. Serial No. 59,696. (No specimens.)

*To all whom it may concern:*

Be it known that I, EUGENE R. EDSON, a resident of Cleveland, in the county of Cuyahoga and State of Ohio, have invented certain new and useful Improvements in the Production of Oil from Fish or other Oil-Yieldable Material; and I do hereby declare the following to be a full, clear, and exact description of the invention, such as will enable others skilled in the art to which it pertains to make and use the same.

This invention relates to improvements in reducing or rendering fish or fish waste or other oil-yieldable material to obtain oil.

The object of this invention is to obtain a comparatively clear or pure oil by treating the oil-yieldable material under pneumatic pressure within a closed receptacle and by the pressure upon the material undergoing treatment preventing ebullition or agitation of the mass by the heat or fermentation within the mass, and thereby preventing the formation of an emulsion by the oil and other liquid or fluid portions of the mass.

With this object in view and to the end of realizing other advantages hereinafter appearing the invention consists in the steps or peculiarities hereinafter described, and pointed out in the claims.

In the accompanying drawings, Figure I is a side elevation, largely in section, of apparatus suitable for carrying out the improved process which constitutes the subject-matter of this application. Fig. II is a vertical section in detail, showing the vessel and strainer carried by the receiving end of the oil-conducting pipe.

Referring to the drawings, $a$ designates a vertically-arranged or upright receptacle, into which the oil-yieldable material—fish, fish waste, or other matter—is introduced for treatment to extract or flow the oil from the material. The receptacle $a$ is a closed container provided at its upper end and centrally with a manhole and charging aperture or inlet 5 and has a cover $b$, arranged to close the said inlet and hinged at one side, as at 6, to the flange 7, which is formed upon the receptacle around the said inlet. The oil-yieldable material requiring treatment is introduced into the receptacle at the inlet 5. The door $b$ is secured in its closed position in any approved manner.

The receptacle $a$ is provided centrally with a core-forming heating-drum $c$, which is arranged vertically and extends from near the upper end to near the lower end of the said receptacle. The drum $c$ is supported in any approved manner from the receptacle $a$.

A closed heating-jacket $d$ surrounds the receptacle $a$ and extends from the upper end to the lower end of the receptacle $a$. The jacket $d$ comprises, preferably, a casing, whose chamber surrounds the receptacle $a$ and is in open relation at its lower end with a valved pipe $e$ for supplying the heating agent—steam or whatever it may be—to the said chamber, and the chamber of the jacket $d$ is connected by pipes $f$ and $g$ with the upper and lower ends of the chamber of the inner drum $c$. The valve 8 of the pipe $e$ is normally closed.

The receptacle $a$ is provided at its lower end and centrally with a valved outlet 10, at which is discharged the residue remaining after the extraction of the oil from the material treated within the said receptacle. The valve 11 of the outlet 10 is preferably a slide-valve and of course normally closed.

A valved pipe $k$, arranged to discharge into the upper portion of the receptacle $a$, leads from a compressed-fluid reservoir $j$, in which compressed air or other aeriform or gaseous fluid under pressure is preferably stored. The valve 12 of the pipe $k$ is normally closed.

A vertically-arranged valved oil-conducting pipe $l$ extends into the upper portion of the receptacle $a$ and has its lower and receiving end arranged within a cup or vessel $m$, which is secured to or suspended from the pipe in any approved manner. The pipe $l$ is adjustable vertically and is provided outside of the receptacle $a$ with a vertically-arranged rack $n$, which is rigidly secured to and arranged longitudinally of the pipe $l$, and is in mesh with a pinion $o$, supported and operated in any approved manner. The pipe $l$ extends above the rack $n$ a suitable distance and at its upper end connects with a flexible tube or hose $p$.

In operating the apparatus the cover $b$ of the receptacle $a$ is opened and material requiring treatment is introduced at the inlet 5 of the said receptacle. The receptacle $a$ is filled with material from the inlet 5 to the upper end of the drum $c$, as indicated by the dotted line $h$. When the receptacle $a$ has been supplied with the material requiring treatment, the cover $b$ is closed and the valve 8 of the pipe $e$ is opened, so as to supply steam or heating fluid to the chamber of the jacket $d$ and by means of the pipes $f$ and $g$ to the chamber of the drum $c$. Steam is preferably employed, and a pressure of steam sufficient to heat the means within the receptacle $a$ quickly and thoroughly—say a pressure of about fifteen pounds—may be employed; but so high a pressure of steam would, unless the mass were kept quiet by some other agency, result in heating and agitating the mass to such an extent as to result in an emulsification of the oil extracted from the material, and consequently air or other aeriform or gaseous fluid under sufficient pressure is admitted to the receptacle $a$, preferably on top of the mass within the said receptacle, by the pipe $k$ upon opening the valve 12 of the said pipe. An adequate pressure of air or other aeriform or gaseous body admitted upon top of the mass within the receptacle has been found necessary to prevent an ebullition or agitation of the mass by the heat or fermentation within the mass, and a pressure of twenty pounds per square inch on top of the mass has been found very efficient against fifteen pounds of steam-pressure employed in heating the mass.

Fish or fish waste is more liquid than solid, and the oil contained in the said material becomes readily liberated during the treatment of the material within the receptacle $a$ and rises and accumulates on top of the mass within the said receptacle, and the pipe $l$ is lowered until the cup or vessel $m$ is submerged in the risen layer of oil, when oil flows into the vessel $m$ and thence into the pipe $l$ and is forced through the said pipe and the connected tube $p$ upon opening the valve 13 of the said pipe $l$ by the pressure conducted to the mass. The dotted line $r$ indicates the top of a layer of oil formed at the top of the mass. The pipe $l$ extends downwardly into the vessel $m$ to near the lower end of the vessel, so that the oil can flow into the pipe only from within the said vessel. The oil is therefore overflown from the top of the mass into the vessel $m$ and thence is conducted off by the pipe $l$. A strainer $s$ extends over the top of the vessel $m$ around the pipe $l$ and prevents coarse foreign matter from entering the vessel with the oil. The strainer $s$ has ears or flanges 16, removably secured, by means of screws 17, to the upper end of the vessel $m$. The said strainer has an inner annular flange 18, embracing and removably secured, by means of screws 19, to the pipe $l$. The vessel $m$ is therefore supported from the pipe $l$ through the medium of the strainer $s$. It will be observed also that the material undergoing treatment within the receptacle $a$ is heated by heat radiating outwardly through the mass from the drum $c$ and by heat radiating inwardly through the mass from the jacket $d$, so that the mass is quickly and uniformly heated throughout.

Of course the jacket $d$ is provided at its lower end with a valved drain-pipe 20.

I would remark also that the pipe $k$ has its discharging end arranged to discharge laterally into the chamber of the receptacle $a$, as indicated by the arrow, so as to avoid stirring the mass within the said receptacle during the supply of pressure to the receptacle.

Although the treatment of material with heat is necessary to satisfactorily carry out the process hereinbefore described, I would have it understood that my invention is not limited to any particular degree of heat and that the treatment of material at a heating temperature considerably below 212° Fahrenheit would be found adequate in some cases.

The apparatus illustrated and described in this application forms a portion of the subject-matter of a contemporaneous application of even date and bearing Serial No. 59,695.

What I claim is—

1. An improvement in the production of oil from oil-yieldable material, comprising the heating of the material within a closed receptacle, and subjecting the material, during its treatment within the receptacle, to a pneumatic pressure greater than the pressure which results from the heating of the material so as to prevent ebullition or agitation of the mass during the said treatment of the material.

2. An improvement in the production of oil from oil-yieldable material, comprising the heating of the material within a closed receptacle having an oil-outlet, and subjecting the material, during its treatment within the receptacle, to the pressure of an aeriform or gaseous fluid under pressure high enough to prevent a detrimental disturbance, in the mass, resulting from the heating of the material, and conducting the oil liberated from the material out of the receptacle.

3. An improvement in the production of oil from oil-yieldable material, comprising the heating of the material within a closed receptacle having an oil-outlet, and subjecting the material, during its treatment within the receptacle, to the pressure of an aeriform or gaseous fluid under pressure high enough to prevent ebullition or agitation resulting from the heating of the mass, and to force the oil liberated from the material out of the receptacle at the aforesaid outlet.

4. An improvement in the production of oil from oil-yieldable material, comprising the heating of the material within a closed steam-heated receptacle, and subjecting the material, during its treatment within the receptacle, to a pneumatic pressure greater than the pressure of steam employed in heating the receptacle, so as to avoid ebullition or agitation resulting from the heating of the material, and separating the liberated oil from the material undergoing treatment, substantially as and for the purpose set forth.

5. An improvement in the production of oil from oil-yieldable material, comprising the heating of the material within a closed receptacle having an oil-outlet, and subjecting the material, during its treatment within the receptacle, to the pressure of an aeriform or gaseous body under pressure high enough to prevent ebullition or agitation resulting from the heating of the material, and conducting the oil liberated from the material out of the receptacle at the aforesaid oil-outlet, and straining the oil during its passage from the receptacle.

Signed by me at Cleveland, Ohio, this 2d day of May, 1901.

EUGENE R. EDSON.

Witnesses:
C. H. DORER,
A. H. PARRATT.